United States Patent
Chari et al.

(10) Patent No.: US 12,003,392 B2
(45) Date of Patent: Jun. 4, 2024

(54) DATA AGGREGATION FOR COMMUNICATIONS NETWORK OPTIMIZATION

(71) Applicant: ARRIS Enterprises LLC, Suwanee, GA (US)

(72) Inventors: Santhana Chari, Johns Creek, GA (US); David E. Virag, Johns Creek, GA (US); Deepak Garageswari Jagannath Rao, Beaverton, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/845,925

(22) Filed: Jun. 21, 2022

(65) Prior Publication Data

US 2022/0407789 A1    Dec. 22, 2022

Related U.S. Application Data

(60) Provisional application No. 63/213,066, filed on Jun. 21, 2021.

(51) Int. Cl.
*H04L 12/26* (2006.01)
*H04L 43/065* (2022.01)
*H04L 43/067* (2022.01)

(52) U.S. Cl.
CPC .......... *H04L 43/065* (2013.01); *H04L 43/067* (2013.01)

(58) Field of Classification Search
CPC ......... H04L 43/02–04; H04L 43/06–08; H04L 43/0876–091; H04L 43/16
See application file for complete search history.

(56) References Cited

U.S. PATENT DOCUMENTS

| | | | |
|---|---|---|---|
| 6,956,866 B1 * | 10/2005 | Li | H04L 43/103 709/224 |
| 2016/0050127 A1 * | 2/2016 | Prodan | H04B 1/40 375/222 |
| 2016/0080226 A1 * | 3/2016 | Poola | H04L 41/069 709/224 |
| 2017/0019242 A1 | 1/2017 | Jin et al. | |
| 2017/0373950 A1 * | 12/2017 | Szilagyi | H04L 43/091 |
| 2018/0115469 A1 * | 4/2018 | Erickson | H04L 43/026 |
| 2020/0336923 A1 | 10/2020 | Li et al. | |

FOREIGN PATENT DOCUMENTS

WO    2016032615 A1    3/2016

OTHER PUBLICATIONS

Kishore, "Router vs Switch vs Hub vs Modem vs Access Point vs Gateway", Help Desk Geek (Year: 2018).*
International Search Report and Written Opinion RE: Application No. PCT/US2022/34413, dated Sep. 15, 2022.

* cited by examiner

*Primary Examiner* — Boris D Grijalva Lobos
(74) *Attorney, Agent, or Firm* — Chernoff, Vilhauer, McClung & Stenzel, LLP

(57) ABSTRACT

Systems and methods for aggregating samples of Proactive Network Maintenance (PNM) data representing state information of a communications network. Each sample may be associated with one of a plurality of different frequency ranges, where the samples are aggregated over a temporal range and aggregated over a frequency range. The data aggregated in this manner may then be used to configure the network.

10 Claims, 6 Drawing Sheets

DATA AGGREGATION FOR COMMUNICATIONS NETWORK OPTIMIZATION

CROSS REFERENCE TO RELATED APPLICATIONS

The present application claims priority to U.S. Provisional Application No. 63/213,066 filed Jun. 21, 2022, the contents of which are each incorporated herein by reference in their entirety.

BACKGROUND

The subject matter of this application generally relates to systems and methods that aggregate network maintenance data in communications networks, such as Hybrid Fiber Coax (HFC) systems.

Cable Television (CATV) services have historically provided content to large groups of subscribers from a central delivery unit, called a "head end," which distributes channels of content to its subscribers from this central unit through a branch network comprising a multitude of intermediate nodes. Modern CATV service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber, and to the content provider through the branch network.

To this end, these CATV head ends include a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). Still other modern CATV systems called Remote PHY (or R-PHY) relocate the physical layer (PHY) of a traditional CCAP by pushing it to the network's fiber nodes. Thus, while the core in the CCAP performs the higher layer processing, the R-PHY device in the node converts the downstream data sent by the core from digital-to-analog to be transmitted on radio frequency and converts the upstream RF data sent by cable modems from analog-to-digital format to be transmitted optically to the core. Other modern systems push other elements and functions traditionally located in a head end into the network, such as MAC layer functionality(R-MAC-PHY), etc.

CATV systems traditionally bifurcated available bandwidth into upstream and downstream transmissions, i.e., data is only transmitted in one direction across any part of the spectrum. For example, early iterations of the Data Over Cable Service Interface Specification (DOCSIS) assigned upstream transmissions to a frequency spectrum between 5 MHz and 42 MHz and assigned downstream transmissions to a frequency spectrum between 50 MHz and 750 MHz. Later iterations of the DOCSIS standard expanded the width of the spectrum reserved for each of the upstream and downstream transmission paths, but the spectrum assigned to each respective direction did not overlap. Recently however, proposals have emerged by which portions of spectrum may be shared by upstream and downstream transmission, e.g., full duplex and soft duplex architectures.

Regardless of which of the foregoing architectures are employed, Proactive Network Maintenance (PNM) measurements are used in cable access networks to collect data that provides information about the status of the network, from which network configuration, maintenance, or other corrective actions may be taken. PNM measurements, for example, include full-band spectrum (FBS) capture data that measures signal quality in both upstream and downstream directions across the full network spectrum. Such measurement may be used, for example, to arrange or rearrange cable modems into interference groups in full duplex architectures, adjust modulation profiles in specific subcarriers, etc. Other PNM measurements may measure signal quality in only specific subcarriers, and in either case signal quality may be measured using any of a number of metrics, e.g., Signal-to-Noise (SNR) Modulation Error Ratio (MER), impulse noise measurements etc. Other PNM measurements may measure distortion metrics from which pre-equalization coefficients may be derived, which are used to pre-distort transmitted signals to compensate for channel distortion that occurs in the fiber portion of the network. Other PNM measurements may include impulse noise measurements, histograms, and any other metric relevant to a state of the transmission network. These PNM measurements are often performed independently for the upstream (US) and downstream (DS) channels by collecting the relevant data from the CMTS and Cable Modems (CM) respectively.

In a large communications network, the PNM data may be collected from several tens of millions of CMs and several hundred of CMTSs. This data collection is repeated at a periodic interval ranging from a few minutes to an hour or in some cases every 24 hours depending on the nature of the measurement. Each PNM measurement gives a snapshot or the "static" status of the cable access network. For example, the FBS or the MER data collected at a given instant of time contains information about the spectral power and Signal-to-noise ratio of the channel at the time of capture for a specific CM. While the static information is useful, there are several sources of interferences in the cable network that are dynamic and transient in nature. For example, one common sources of transient interference is Long Term Evolution (LTE) noise from cellular base stations and handsets. This dynamic, or transient data however, is not adequately captured by the static PNM measurements as just described.

What is desired, therefore, are improved systems and methods that better represent the dynamic and transient state of a communications network, such as an HFC network, using collected PNM measurements, even though each measurement taken at a discrete interval in time.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
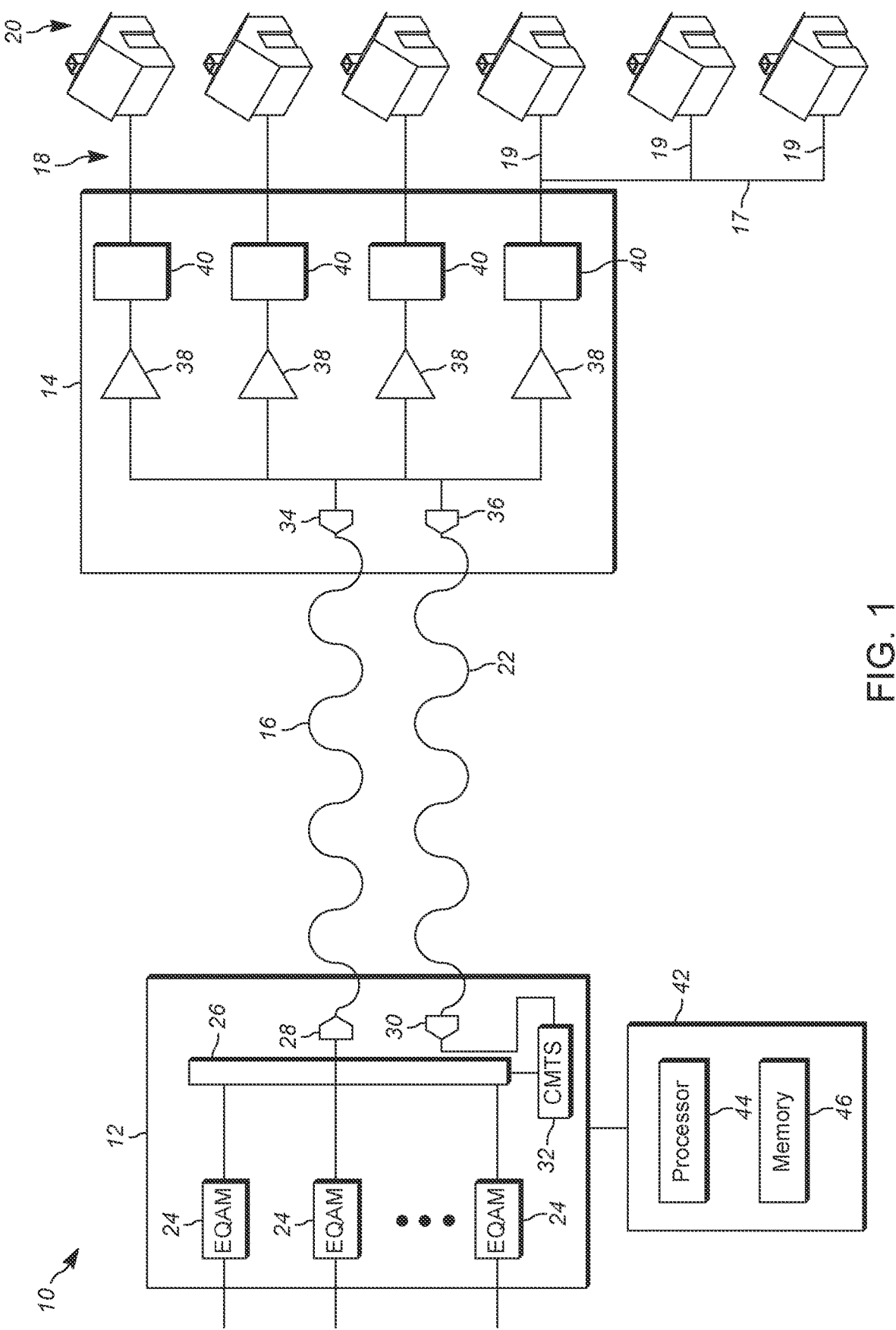
FIG. 1 shows an exemplary HFC network from a head end to a node that serves a plurality of home subscribers.

The systems and methods disclosed in the present application will be described in relation to an exemplary Hybrid Fiber-Coaxial (HFC) network that is used for illustrative purposes only, as the systems and methods described in the present specification may also apply to any other information-carrying network, such as telephone networks, optical communications networks, etc. Specifically referring to FIG. 1, an exemplary Hybrid Fiber-Coaxial (HFC) network 10 may include a head end 12 that delivers content over a forward path to a node 14 using an optical transmission line 16. The node 14 may in turn deliver content to a plurality of subscribers 20 over a coaxial network 18. Subscriber's homes are typically connected to the node 14 using trunk cables 17 and feeder cable or "taps" 19. The HFC network 10 may likewise transmit signals over a return path from each of the subscribers 20 to the node 14 through the coaxial network 18, which in turn transmits the return path signal to the head end 12 through an optical transmission line 22.

The head end 12 may preferably modulate a plurality of QAM channels using one or more EdgeQAM units 24. The QAM modulation of these channel will be described later in this disclosure. The respective channels may be combined by an RF combining network 26 that multiplexes the signals and uses the multiplexed signal to modulate an optical transmitter 28 (e.g., a laser) that delivers the optical signal to transmission line 16. The head end 12 may also include an optical receiver 30 that receives return path signals from the optical transmission line 22 and delivers the return path signals to a Cable Modem Termination System (CMTS) 32, which instructs each of the cable modems when to transmit return path signals, such as Internet protocol (IP) based signals, and which frequency bands to use for return path transmissions. The CMTS 32 demodulates the return path signals, translates them into (IP) packets, and redirects them to a central switch (not shown) that transmits the IP packets to an IP router for transmission across the Internet. It should be understood by those skilled in the art that this configuration may be modified in any number of manners. For example, one or more of the EQAM units may be analog modulated or digitally modulated, or may be directly modulated in a Converged Cable Access Platform (CCAP). Similarly, the head end may include an A/D converter between the RF combining network 26 and the optical transmitter 28 so as to modulate the optical signal to the node using a digital rather than an analog signal.

The node 14 may include an optical receiver 34 to receive a forward path signal from the head end 12 over the optical transmission line 16, along with an optical transmitter 36 to send the return path signals to the head end 12 over the optical transmission line 22. The optical receiver 34 is preferably capable of demultiplexing a received optical signal and using the demultiplexed signals to modulate respective RF signals sent to subscribers 20 through a network of amplifier units 38 and diplexers 40.

As noted previously, the respective RF signals communicated between the node 14 and the subscribers 20 include both forward path and reverse path transmissions, both typically carried over a common coaxial cable.

As can be appreciated from FIG. 1, the node 14 must be capable of separately processing the forward and return path signals that are propagated on the same coaxial cable. In FIG. 1 for example, CATV amplifiers such as the amplifier units 38 amplify the forward path signal and the return path signal simultaneously. Thus, the amplifier units 38 may typically be operatively connected to a minimum of two diplex filters—a first diplex filter that separates the return path from the forward path, after which these RF signals are separately amplified, and then a second diplex filter (e.g. diplexers 40) that recombines the separated signals onto a common coaxial cable sent to a subscriber 20 or to a head end.

Those of ordinary skill in the art will appreciate that other HFC architectures than that shown in FIG. 1 may also be used to communicate communications signals. For example, distributed access architectures may be employed that move much of the functionality shown in the head end (e.g., the EQAM modules 24 and/or portions of the CMTS functionality) into the nodes 14. Such distributed access architectures include R-PHY and R-MACPHY architectures.

As previously noted, and regardless of the particular architecture involved, management of a communications network requires periodic measurement of state variables that represent system health or status. Such measurements in an HFC network can include, for example, full-band spectrum (FBS) capture data, pre-equalization coefficients, impulse noise measurements, histograms, Modulation Error Ratios (MER), etc. In other types of communications networks other measurements or metrics may be periodically captured, but to illustrate the disclosed systems and methods the present specification will refer to the example of capturing Modulation Error Ratio (MER) data for OFDM channels communicated between a head end and a cable modem, or if a distributed access architecture is employed, QAM signals exchanged between a cable modem and a Remote Physical Device (RPD) or Remote MAC-PHY (RMD) in a node.

Orthogonal Frequency Division Multiplexing (OFDM) technology was introduced as a cable data transmission modulation technique during the creation of the CableLabs DOCSIS 3.1 specification. OFDM technology was defined for use directly in the downstream direction and was adapted for multiple access (Orthogonal Frequency Division with Multiple Access—OFDMA) for use in the upstream direction. In each direction, the relatively wide channel is subdivided into many small subcarriers. In the downstream direction, each of these subcarriers may use its own Quadrature Amplitude Modulation (QAM) level, which equates to a different bit capacity per subcarrier QAM symbol. In the upstream direction, groups of subcarriers are combined and, when time multiplexed, create the atomic unit of upstream bandwidth assignment known as a "minislot." In the upstream direction, all subcarriers of a minislot are assigned the same QAM level and thus all subcarriers of a minislot have the same bit capacity per QAM symbol.

The purpose of OFDM/OFDMA technology is to maximize the efficiency of data transmissions across a cable data network by optimizing the QAM modulation level used for each subcarrier of RF frequency bandwidth. OFDM is based on the well-known technique of Frequency Division Multiplexing (FDM). In FDM different streams of information are mapped onto separate parallel frequency channels. Each FDM channel is separated from the others by a frequency guard band to reduce interference between adjacent channels.

Orthogonal Frequency Division Multiplexing (OFDM) extends the FDM technique by using multiple subcarriers within each channel. Rather than transmit a high-rate stream of data with a single subcarrier, OFDM makes use of a large number of closely spaced orthogonal subcarriers that are transmitted in parallel. Each subcarrier is modulated with a conventional digital modulation scheme (e.g. QPSK, 16 QAM, etc.) at low symbol rate. However, the combination of many subcarriers enables data rates similar to conventional single-carrier modulation schemes within equivalent bandwidths.

Figure 2:
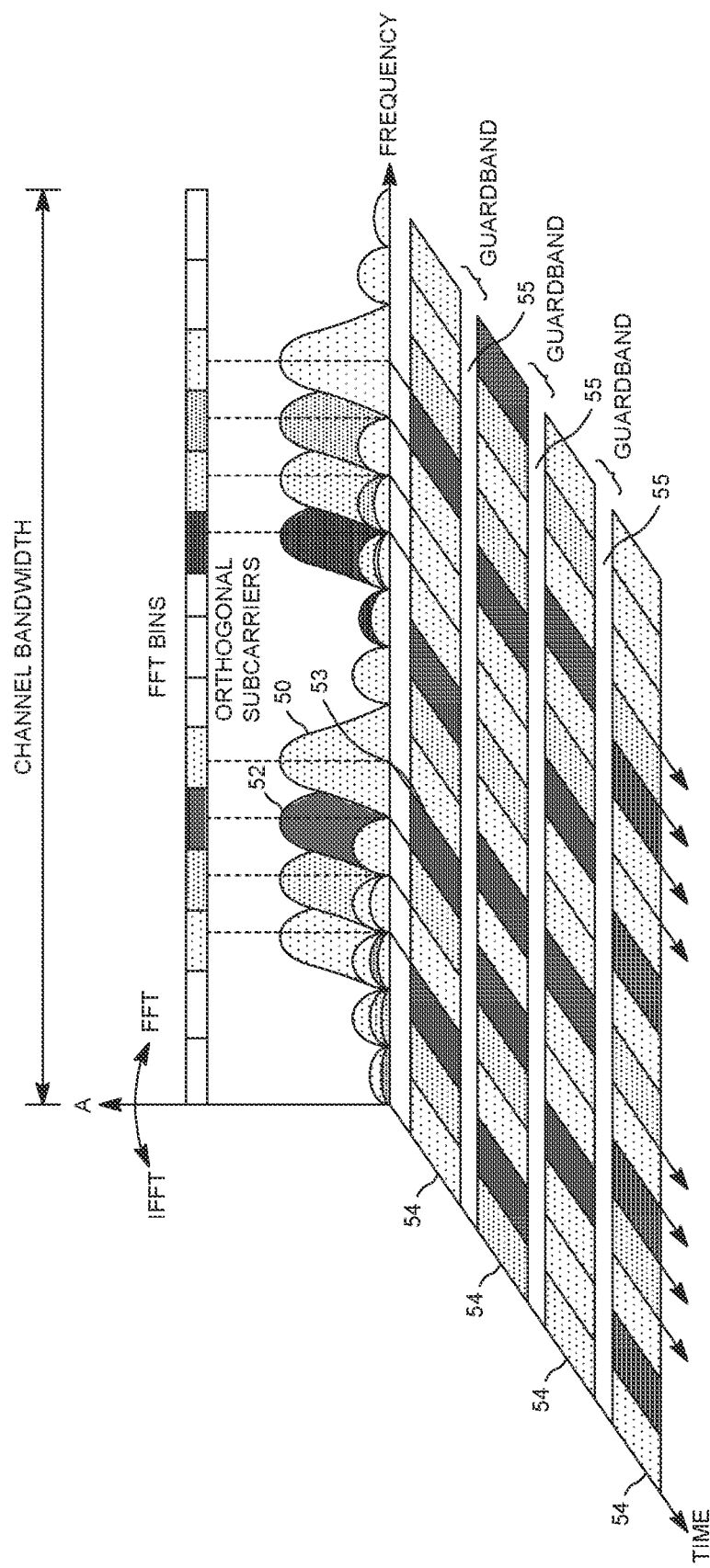
FIG. 2 illustrates an Orthogonal Frequency Division Multiplexing technique.

Referring for example to FIG. 2, in the frequency domain, adjacent orthogonal tones or subcarriers 50 and 52 may be each independently modulated with complex data. Though only two subcarriers are illustrated in FIG. 2, those of ordinary skill in the art will appreciate that a typical OFDM transmission will include a large number of orthogonal subcarriers. As just note noted, subcarriers 50 and 52 (as well as all other subcarriers) are orthogonal to each other. Specifically, as can be seen in FIG. 2, subcarrier 50 has spectral energy comprising a sinc function having a center frequency 53 with sidebands having peaks and nulls at regular intervals. These sidebands overlap those of subcarrier 52, but each of the spectral peaks of subcarrier 50 align with the nulls of subcarrier 52. Accordingly, the overlap of spectral energy does not interfere with the system's ability to recover the original signal; the receiver multiplies (i.e., correlates) the incoming signal by the known set of sinusoids to recover the original set of bits sent.

In the time domain, all frequency subcarriers 50, 52 etc. are combined in respective symbol intervals 54 by performing an Inverse Fast Fourier Transform (IFFT) on the individual subcarriers in the frequency domain. Guard bands 55 may preferably be inserted between each of the symbol intervals 54 to prevent inter-symbol interference caused by multi-path delay spread in the radio channel. In this manner, multiple symbols contained in the respective subcarriers can be concatenated to create a final OFDM burst signal. To recover the signal at a receiver, a Fast Fourier Transform (FFT) may be performed to recover the original data bits.

Figure 3:
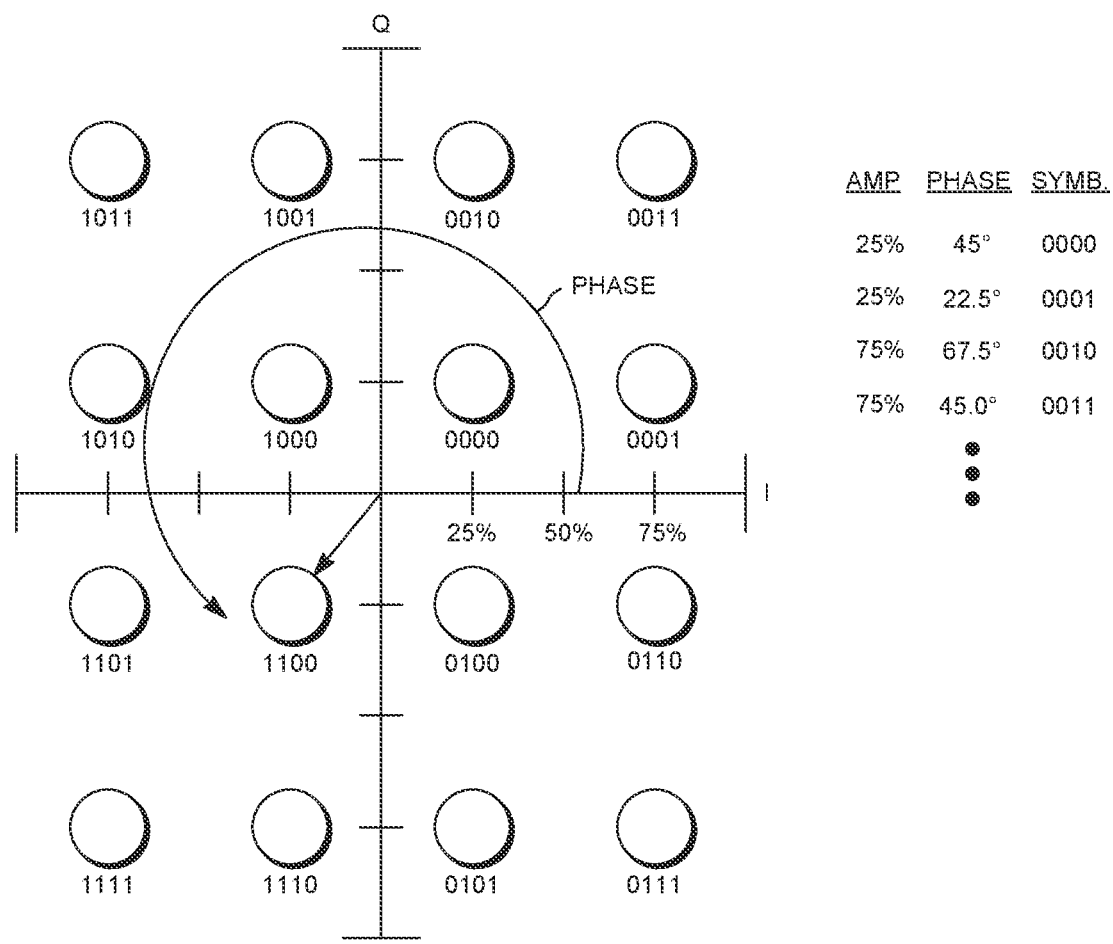
FIG. 3 illustrates a Quadrature Amplitude Modulation technique.

As also noted previously, each subcarrier in an OFDM transmission may be independently modulated with complex data among a plurality of predefined amplitudes and phases. FIG. 3, for example, illustrates a Quadrature Amplitude Modulation (QAM) technique where a subcarrier may be modulated among a selective one of sixteen different phase/amplitude combinations (16 QAM). Thus, for example, subcarrier 50 of FIG. 2 may in a first symbol interval transmit the symbol 0000 by having an amplitude of 25% and a phase of 45° and may in a second symbol interval transmit the symbol 1011 by having an amplitude of 75% and a phase of 135°. Similarly, the subcarrier 52 may transmit a selected one of a plurality of different symbols.

FIG. 3 illustrates a 16 QAM modulation technique, but modern DOCSIS transmission architectures allow for modulations of up to 16384 QAM. Moreover, each of the subcarriers 50, 52, etc. shown in FIG. 2 may operate with its own independent QAM modulation, i.e. subcarrier 50 may transmit a 256 QAM symbol while subcarrier 52 may transmit a 2048 QAM symbol. Thus, in order for a receiver and a transmitter to properly communicate, a bit loading profile is a vector that specifies, for each subcarrier, the modulation order (16 QAM, 256 QAM, etc.) used by the subcarrier during each symbol interval 54. The current DOCSIS 3.1 specification allows each cable modem to be assigned up to five different bit loading profiles in the downstream direction, and up to two different bit loading profiles in the upstream direction. The bit loading profile used for a given symbol interval 54 is communicated between the cable modem and a head end, so that transmitted information can be properly decoded.

Ideally each cable modem 16 would be assigned a bit loading profile specifically tailored to the performance characteristics of the channel between the CMTS and that cable modem. For example, higher nodulation orders can be assigned to subcarriers experiencing higher signal quality over a channel used by a cable modem, and lower modulation orders may be best for subcarriers with low signal quality. In this manner, the bandwidth efficiency of transmissions to and from a cable modem are high when if the cable modem's ideal bit loading vector closely follows the bit loading profile in use by the cable modem. However, because the DOCSIS standard restricts the number of available profiles that can be used by cable modems, a CMTS 32 must communicate with multiple cable modems with different noise profiles using the same bit loading profile.

Thus, in order to most efficiently use the limited number of available bit loading profiles, the CMTS 32 preferably divides cable modems or customers 20 into groups that each have similar performance characteristics. To this end, the CMTS 32 may capture Modulation Error Ratio (MER) measurements by periodically including in the downstream transmission known pilot tones that together span the entire OFDM downstream bandwidth. Each cable modem then uses these pilots to measure its error for received downstream transmissions at each subcarrier frequency, where the error at a particular modulation frequency is measured based on the vector in the I-Q plane (shown in FIG. 3) between the ideal constellation point at that modulation order and the actual constellation point received by the receiver. Such error measurements may comprise any of several available forms, including the actual error vector, the Euclidian distance between these two points, or the Modulation Error Ratio (MER) calculated from the error vector. Alternatively, in some embodiments, the error measurement may be expressed as a maximum QAM value that a cable modem may reliably use at a given subcarrier, given the measured error. For example, the DOCSIS 3.1 PHY specification contains tables that map modulations orders to the minimum carrier-to-noise ratios (approximated by MER) required to carry them, as shown in the following exemplary table in the downstream direction:

| Constellation | CNR (1 GHz) | CNR (1.2 GHz) |
| --- | --- | --- |
| 4096 | 41 | 41.5 |
| 2048 | 37 | 37.5 |
| 1024 | 34 | 34. |
| 512 | 30.5 | 30.5 |
| 256 | 27 | 27 |
| 128 | 24 | 24 |
| 64 | 21 | 21 |
| 16 | 15 | 15 |

In this exemplary table, "CNR" or Carrier Noise Ratio is defined as the total signal power in an occupied bandwidth divided by the total noise in that occupied bandwidth, and ideally is the equivalent of equalized MER.

The collection of the errors for a cable modem, across all subcarrier frequencies, produces the modulation error vector for that cable modem 16, which is transmitted back to the CCAP 12. For upstream transmissions, the process is generally reversed; the CCAP 12 commands each cable modem to send known pilot tones to the CCAP 12 together spanning the entire OFDM upstream bandwidth in a single upstream probing signal for each particular cable modem 16. The CCAP 12 uses these received probing signals to estimate the upstream modulation error vectors for each of the cable modems.

The result of these MER capture measurements is to assign a set taken from a finite number of bitloading profiles, or modulation profiles, to each cable modem in the upstream and downstream directions. In this manner, each cable model has a primary bitloading profile that that, for each subcarrier, instructs it as to what modulation order to use for receiving a downstream transmission and sending an upstream transmission, as well as several backup bitloading profiles that the cable modem may use when signal quality degrades.

As already noted, the PNM data such as the MER measurements just described may be collected from several tens of millions of cable modems and several hundred of CMTSs/RPDs/RMDs. This data collection is repeated at a periodic interval ranging from a few minutes to an hour or in some cases every 24 hours depending on the nature of the measurement. Each PNM measurement gives a snapshot or the "static" status of the cable access network. For example, the FBS or the MER data collected at a given instant of time contains information about the spectral power and noise of the channel at the time of capture for a specific cable modem. While the static information is useful, there are several sources of interferences in the cable network that are dynamic and transient in nature. For example, one common sources of transient interference is noise from cellular base stations and handsets.

To identify and to mitigate the effects of time varying interference, the present disclosure describes systems and methods that aggregate and optimize PNM data in a useful manner. Systems and methods disclosed in this specification may be applied to any PNM measurement, but for convenience they will be described with respect to MER measurements. The terms MER is sometimes used to describe MER measurements collected by a CMTS from receipt of upstream data while RxMER (receiver MER) is sometimes used to denote error measurements collected by cable modems from downstream communications, but for purposes of this disclosure, the term MER will be used to describe either.

MER, or modulation error ratio, is mathematically defined as the ratio of the root mean square (RMS) power (in Watts) of the reference vector (as described with respect to FIG. 3) to the power (in Watts) of the error. It is defined in decibels as $MER(dB)=10 \log_{10}(P_{signal}/P_{error})$. The MER data collected from the cable modem contains information about the noise in the downstream channel, while the MER data collected from the CMTS contains information of the noise in the upstream channel. In DOCSIS 3.1 the downstream channel uses Orthogonal Frequency Division Multiplexing (OFDM) and therefore the downstream channels are referred to as OFDM channels. The upstream channels use OFDM with multiple access, and are therefore referred to OFDMA channels.

Figure 4:
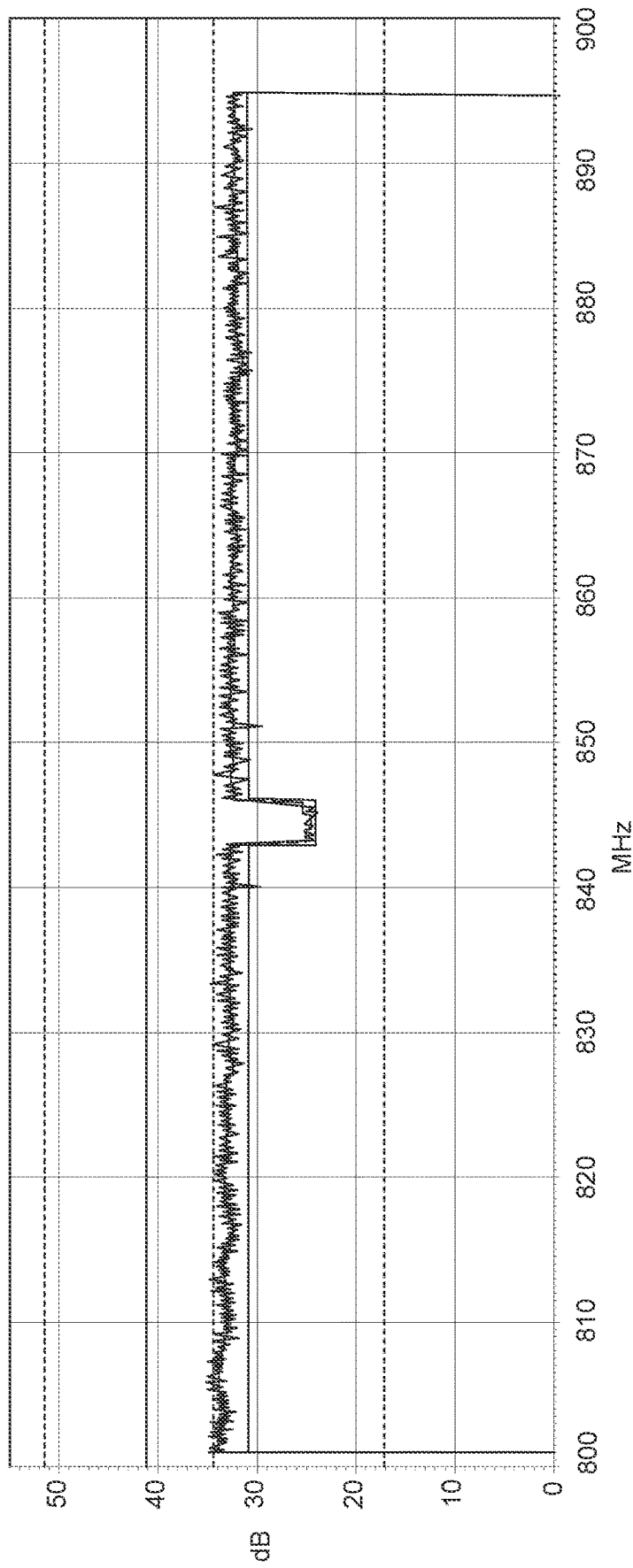
FIG. 4 shows a plot of MER values collected from a cable modem for a downstream OFDM channel.

FIG. 4 shows MER data collected from a specific cable modem. In this example, the OFDM channel extends roughly from 800 MHz to 890 MHz and the plot shows the MER values at each subcarrier frequency. The subcarriers are spaced at either 25 or 50 KHz. A typical OFDM channel is several tens of MHz wide containing thousands of subcarriers. The lower values of the MER at specific subcarriers between 843 MHz and 846 MHz are caused by interference from external sources such as LTE ingress. This MER data along with similar data collected from other cable modems is subsequently used to derive modulation profiles for the OFDM channels. Subcarrier locations with higher MER (SNR) values are assigned a higher-order modulation while the subcarriers with lower MER values are assigned a lower-order modulation, as high signal-to-noise is required to transmit data at higher-order modulation.

Figure 5:
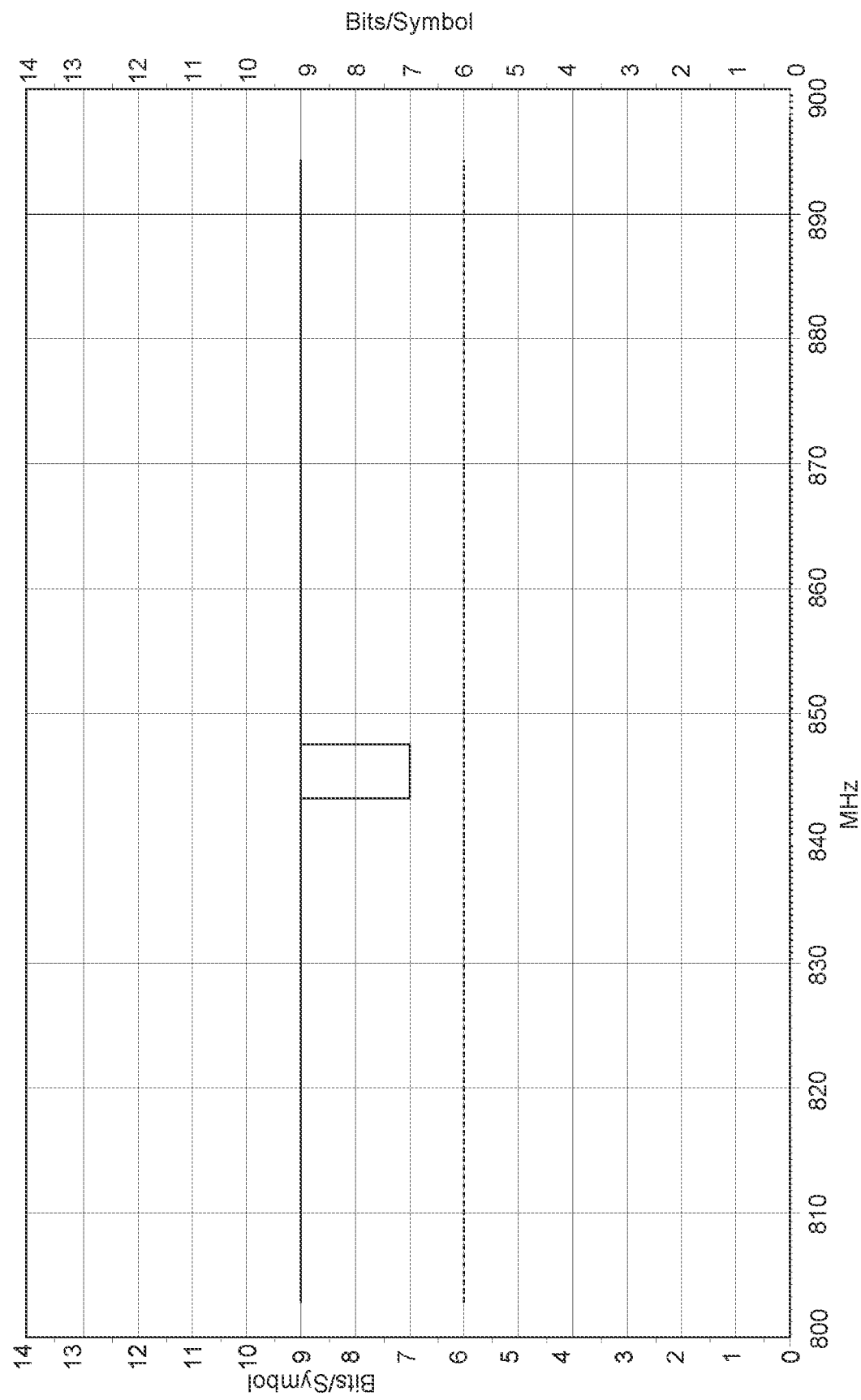
FIG. 5 shows a modulation profile for the cable modem shown in FIG. 4.

FIG. 5 shows the modulation profile assigned to that specific CM based on the MER data. It can be seen that modulation profile uses 9 bits per symbol for most of the OFDM channel except for the frequency span between 843 to 846 MHz where the MER values (SNR) are lower. In this frequency range, a lower order modulation (7 bits per symbol) is used. The modulation profile assignment shown in FIG. 5 may be based on a single snapshot of MER data. Preferably, however, as disclosed below the modulation profiles should be chosen based on MER data collected over time, say every 15 minutes or an hour, which requires aggregation of the data collected over time. Moreover, in addition to aggregation over time, preferably data aggregation occurs over discrete frequency ranges. This is because changes in modulation profiles as shown in FIG. 5 can only occur at certain frequency boundaries, for example every 1 Mhz rather than every subcarrier, due to hardware limitations in the CMTS, RPD, cable modem etc.

Temporal aggregation is preferably performed on a per-cable modem basis for each of the upstream and downstream channels—i.e., MER values captured from the same cable modem for each same upstream or downstream channel are separately aggregated over time. As previously mentioned, transient ingress noise such as LTE noise may appear in the MER measurements sporadically at unpredictable points in points in time. A conservative way of aggregating the MER values over time is to find the minimum value of the MER values for a given subcarrier over time. If $MER_{ij}$ is the MER value of the $i^{th}$ subcarrier at the $j^{th}$ time instance for a given cable modem, one way of computing the aggregation is to compute the minimum value at each subcarrier location as shown below:

$$AggregatedMERi = \min \text{ over 1 to } N (MER_{i_1}, MER_{i_2}, \ldots, MER_{i_N})$$

The minimum MER value computed above may be overly conservative and may result in under-utilization of the channel for most of the time, while there is no LTE ingress interference. So, alternatively a 95% percentile value can be computed as shown below. The percentile value can be chosen based on the required qualify of service.

$$AggregatedMERi = 95\% \text{ percentile of } (MER_{i_1}, MER_{i_2}, \ldots, MER_{i_N})$$

For frequency aggregation, assuming that it needs to be done over subcarriers ranging from 1 through N and $MERi$ is the MER value corresponding to the $i^{th}$ subcarrier, the aggregation is performed as follows:

$$AggregatedMER = N/((1/MER_1)+(1/MER_2)+ \ldots +(1/MER_N))$$

Before performing the aggregation according to the formula above, the MER values which are usually reported in dB (logarithmic scale) are preferably to be converted to linear scale. Those of ordinary skill in the art will appreciate that the frequency aggregation is performed to obtain a single MER value for a frequency range containing multiple sub-carriers, each with a reported MER value.

In one preferred embodiment, temporal aggregation of PNR measurements from a cable modem or other device are performed first, then frequency aggregation is performed on the aggregated temporal measurements. In other embodiments, this process may be reversed such that frequency aggregation is performed first, followed by temporal aggregation.

One challenge associated with collecting MER or other PNM data periodically and aggregating that data is the volume of data that needs to be processed, given that there may be tens of millions of cable modems or similar devices in a real-world deployment. With multiple OFDM and OFDMA channels in the downstream and upstream directions, this amount of data may be too large if the data is collected at a fixed, short time interval for all such cable modems or other devices.

In one embodiment of the disclosure, the data collection may be optimized based on topology information. For example, since the LTE interference is typically localized since it is caused by proximity to nearby cell tower that may sporadically transmit data, the topology information of the physical location (street address or latitude/longitude) of the cable modems may be used to increase or decrease the interval between data collection. Alternatively, if a cable modem exhibits large changes in MER values over time, then more frequent data collection is performed for that CM and optionally a group of CMs that are geographically close to the said CM.

In still another embodiment, the known locations of the cellular base stations can be used to identify a pool of cable modems that are most likely to be affected by LTE interference and increase the frequency of data collection for these CMs that are within a specified distance from the base station.

Figure 6:
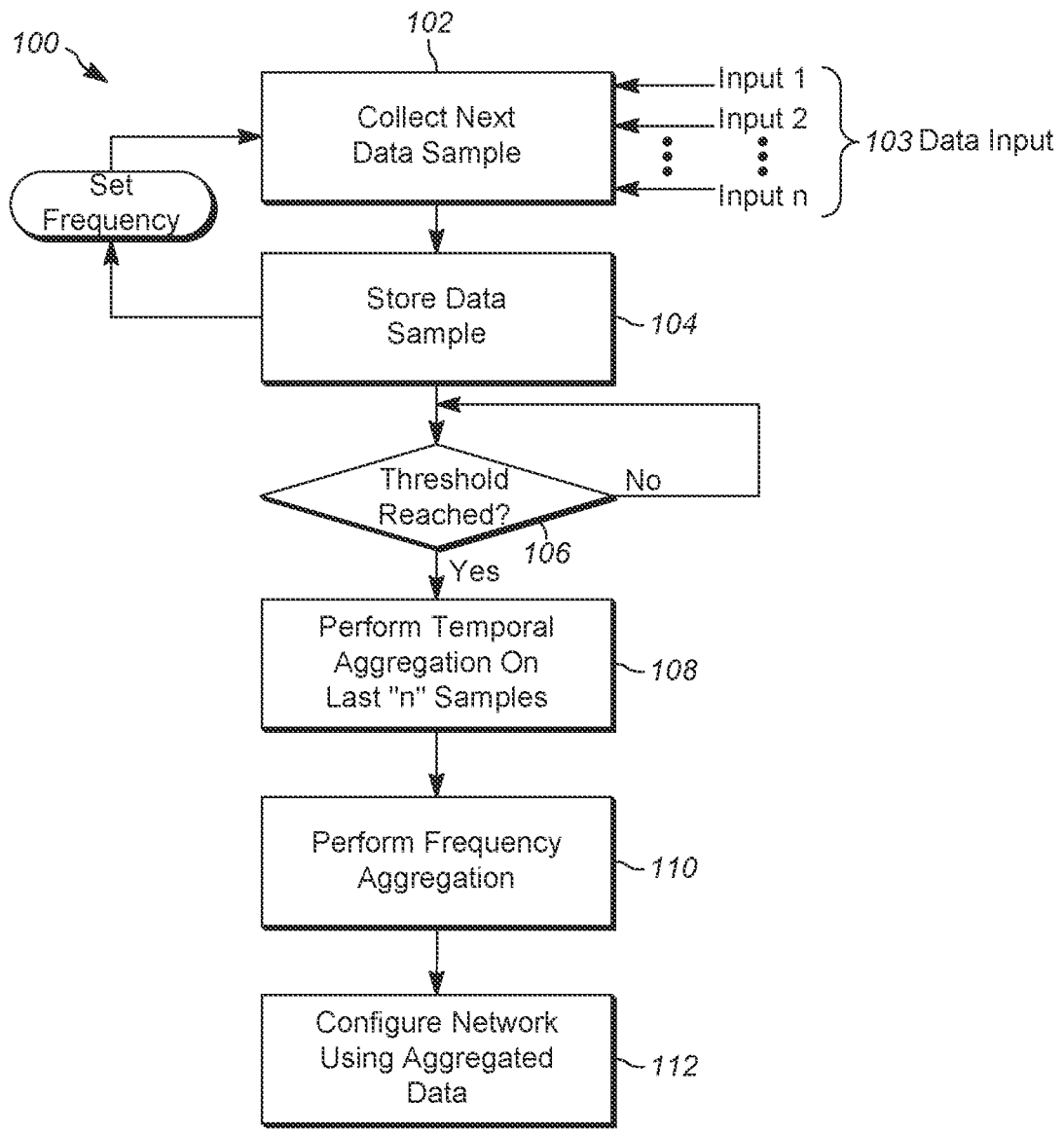
FIG. 6 shows an exemplary method according to one embodiment of the disclosure.

Thus, FIG. 6 shows an exemplary method that utilizes the foregoing embodiments. Specifically, an exemplary method 100 may collect sequential data samples at step 102 received form one or more data inputs 103. Preferably, the method 100 shown in FIG. 6 is implemented on a per-cable modem basis (or other similar device) for which one or more PNR measurements are taken, and therefore the data inputs 1 . . . N may comprise MER measurements, distortion measurements, impulse noise measurements, or any desired measurements together collected from the cable modem/device that are deemed useful for network management.

At step 104 the data sample(s) are stored, and the method proceeds to collect the next sequential set of one or more measurements in step 102. In one embodiment, a variable frequency of data collection may be set at step 105 for the particular cable modem or other device based on any one or more of the factors previously described, or any other desired factor. For example, the value set in step 105 may be based on topology information such as proximity to a cell tower, street address, or alternately based on prior variance in measurements for the cable modem or other device.

At step 106 a determination is made as to whether a threshold number of data samples, for each type of measurement/input has been taken so that temporal averaging is useful. If not, the procedure waits until sufficient samples have been taken to reach the threshold. Once the threshold is reached, at step 108 temporal aggregation is performed on the last "n" samples, which in some embodiments may be the same number as is used for the threshold in step 106. Alternatively, temporal aggregation may be performed on all samples previously collected, or still alternatively on a number of samples up to a second threshold, higher than that used in step 106.

After temporal aggregation has been performed frequency aggregation may be performed at step, and the temporally and frequency aggregated result(s) may be used to configure the communications network at step 112. For example, the aggregated data may be used to sort cable modems into interference groups, as described earlier. Alternatively, the aggregated data may be used to determine which modulation profile a cable modem may use, or used to derive pre-equalization coefficients, etc. As indicated earlier, in some alternate embodiments, the frequency aggregation may instead be performed prior to temporal aggregation, and in such a circumstance step 110 may be performed prior to step 108, prior to step 106, or even prior to step 104.

Referring again to FIG. 1, the foregoing techniques may in some embodiments be implemented in hardware 42 either integrated with, or connected to, head end 12 or any of its components, such as CMTS 32, a CCAP, or in distributed access architectures, the hardware 42 may be implemented in a Remote Physical Device (RPD) or Remote MACPHY device (RMD) in a node, or may be connectable to such devices by any appropriate means, including an ethernet interface accessible over a LAN and/or a wide-area network, such as the Internet. The hardware 42 may preferably include a memory 46 to store collected PNR data and one or more processors 44 to process the data as previously described in this specification, and to configure the network based on the aggregated results. Moreover, the hardware 42 does not need to be co-located in a single device. For example, the memory may comprise remote storage so that, for example, the collected data can be stored in servers in a data center or in the "cloud," and the processing and optimization references that data to generate profiles that are then applied programmatically to the CMTS, cable modems, etc. using interfaces such as CLI, SNMP or REST APIs.

As noted above, one implementation of the foregoing disclosure is to aggregate MER data collected from a communications network. One necessary step of this implementation is to prepare a single MER file for a cable-modem device which is composed of a number of MER samples over a period of time. By considering MER samples over a period of time, instead of taking only a single snapshot MER file, the advantage is achieved of planning for intermittent noise sources that may come and go on the channel and deriving a profile that may be immune to the noise source when it appears.

Device specific collections must be eventually processed into a single MER file prior to running the ICO-2 application as described previously. Processing multiple MER files collected over a time range for a single device consists of finding the minimum RxMER value for each sub-carrier in the channel. This is represented by the pseudo-code below:

```
For each device in OFDM Service Group:
    For each RxMer file in device Collection:
        For each RxMer sub-carrier reading in the RxMer file:
            Device RxMER for sub-carrier = min(all sub-carrier RxMER
            readings)
```

The procedure noted will result in a single RxMER file consisting of the minimum RxMER readings for all devices in the OFDM service group across all the sub-carriers in the channel.

As an example, assume that device 1 has a subcarrier at 700 MHz with a typical RxMER value of 35 dB. On one measurement there is interference from a mobile transmitter resulting in a 23 dB RxMer value. The resultant device RxMer file would be set at the average (see Averaging Noise Power of MER Signals below) for the 700 MHz sub-carrier.

The number of RxMer samples in a collection may be a variable to the algorithm chosen. The term sample is meant to mean an individual RxMER file taken from a specific device at a specific time. The greater the number of samples the longer the memory for any time-varying noise in the channel. If an RxMer sample is taken every day, a collection of 14 samples would represent two weeks of samples. The samples in the collection may be managed in a first-in, first-out basis such that when a new sample arrives the sample from 14 days ago would drop off representing a rolling window of samples for processing the device RxMER files. Alternatively, one could never drop a sample out in which case the effective memory of the channel is infinite. This strategy may not be ideal if the nature of the interfering noise is a one-off or otherwise temporary. If the noise source disappears over time, it would be desirable to restore the sub-carrier to an optimal profile setting reflecting the new noise-free environment. It would be recommended that the size of the collection for processing be a variable that one may vary. A shorter window represents a more aggressive, shorter memory approach to handling time-varying interference while a longer window represents a more conservative, longer memory approach.

The RxMer numbers are represented in the dB format. dB format represents a non-linear transformation from the underlying measurement. Changes in dB scale are additive while changes in the underlying measurement are multiplicative. For example, the value of 10 dB is equal to the underlying real value of 10 while the value of 20 dB is equal to an underlying value of 100. Because of this non-linear transformation, averaging the numbers in dBs must be calculated by converting each dB value to its underlying linear number and averaging the resulting values. The average of these values can then be converted back to the dB domain to represent the correct average of the numbers in dB domain. An example table is provided below.

| dB    | linear   | dB(linear) |
|-------|----------|------------|
| 35    | 3162.28  | 35         |
| 40    | 10000.00 | 40         |
| 45    | 31622.78 | 45         |
| 40.00 | 14928.35 | 41.7       |

In the example the left column average (40) represents the simple average of the three dB values while the average in the right column (41.7) represents the true average of the numbers converted back to dB domain. The middle column is the dB values transformed back to the linear domain and averaged. Conversion between dB values and linear values is provided for reference:

Converting values to dB: $dB = 10 * LOG10(linear\_value)$

Converting dB to values: $linear\_value = 10^{(dB/10)}$

The MER values represent a ratio, effectively a signal to noise representation of the integrity of the signal. In the case of a cable plant OFDM signal, there is an assumption that as the MER significantly changes, the change is due primarily to the noise component and not the signal component, i.e., one can assume that the received signal power at the OFDM receiver is constant, even though in reality, the different modulation profiles available to each sub-carrier (e.g. 16-QAM, 64-QAM, ...) have different power densities. However, it is reasonable to make the broad assumption that these do not comprise the primary differences in the MER readings from sample to sample. This assumption is a key difference from the typical scenario that when a signal to noise ratio increases, it is due to an increase in the signal power with constant noise power. Using this assumption, adding S/N ratios must be done in differently than adding traditional numbers—i.e., the numbers should be inverted prior to summing and averaging process and the output of this process re-inverted again. Using the inversion process, the average dB values reflect the variation in noise power given a constant signal power. For example, consider the case with two values, V1 and V2, of 1 dB and 100 dB respectively. If V1 and V2 are assumed to have the same signal power, the noise power in V1 must be much greater than the noise power in V2. The average of the two values therefore must take into account the large noise power of V1.

The table below shows the difference in the two approaches. The first column takes the simple average of the two dB values resulting in 50.5 dB, but this is not correct as described above due to the non-linear transformation involved. Column 3 shows the results if one does a typical averaging of signal/noise powers with the assumption that the signal power is changing and the noise power is constant. In this case the average is 97 dB. The large value is driven by the assumption of the large signal associated with the 100 dB value dominates the average and the resulting 97 dB average value represents dividing the large signal by 2 since the 1 dB value signal would be almost insignificant in comparison.

|     | dB    | linear  | dB   | 1/linear  | Avg  | dB(base10) |
|-----|-------|---------|------|-----------|------|------------|
|     | 1     | 1.3E+0  | 1    | 794.3E-3  |      |            |
|     | 100   | 10.0E+9 | 100  | 1E-10     |      |            |
| Avg | 50.50 | 5.0E+9  | 97.0 | 397.2E-3  | 2.52 | 4.0        |

Finally, columns 4, 5, and 6 show the calculations assuming the signal power is constant and the difference in dB is due to increased noise. In this case, the large noise power associated with the 1 dB signal dominates the equations. The noise associated with the 100 dB measurement is almost insignificant in comparison resulting in the averaged dB value of 4 dB resulting from dividing by 2 the noise power of the 1 dB measurement or equivalently reducing the noise power by 3 dB.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein. In the event of inconsistent usages between this document and those documents so incorporated by reference, the usage in the incorporated reference(s) should be considered supplementary to that of this document; for irreconcilable inconsistencies, the usage in this document controls. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise," or a derivative thereof, when used in a claim, is used in a nonexclusive sense that is not intended to exclude the presence of other elements or steps in a claimed structure or method.

The invention claimed is:

1. A device operatively connectable to a communications network having at least one network component that obtains sequential measurements of Proactive Network Maintenance (PNM) information, each measurement having a common associated metric, and each measurement associated with one of a plurality of different frequency ranges, the device comprising memory configured to store the measurements and at least one processor that performs temporal aggregation of the measurements and frequency aggregation of the measurements, and configures the network based on the temporally and frequency aggregated measurements, where the temporally and frequency aggregated measurements are expressed in the common associated metric.

2. The device of claim 1 where there are a plurality of network components, and the processor separately aggregates data collected from each of the network components.

3. The device of claim 2 where the processor separately temporally aggregates data collected from each of the network components and separately frequency aggregates data collected from each of the network components.

4. The device of claim 2 where the processor is configured to temporally aggregate data from each network component based on data collected according to a frequency of data collection that varies from a first network component relative to a second network component.

5. The device of claim 4 where the frequency of data collection associated with a device is based on topology information of the network.

6. The device of claim 1 where temporal aggregation is performed before frequency aggregation.

7. The device of claim 1 where frequency aggregation is performed before temporal aggregation.

8. The device of claim 1 where the collected PNM data varies in an unpredictable manner.

9. The device of claim 1 where the PNM data represents data collected by and/or sent from a cable modem.

10. The device of claim 9 where the PNM data is separately collected in an upstream direction from the cable modem and a downstream direction to the cable modem.

* * * * *